(12) United States Patent
Eriksson-Ahuja

(10) Patent No.: US 11,457,773 B2
(45) Date of Patent: Oct. 4, 2022

(54) STORAGE UNIT FOR STORING PRODUCTS THAT CAN BE AFFECTED BY HUMIDITY

(71) Applicant: Pyar Ltd., London (GB)

(72) Inventor: Åsa Eriksson-Ahuja, London (GB)

(73) Assignee: Pyar Ltd., London (GB)

( * ) Notice: Subject to any disclaimer, the term of this patent is extended or adjusted under 35 U.S.C. 154(b) by 0 days.

(21) Appl. No.: 16/768,454

(22) PCT Filed: Dec. 4, 2018

(86) PCT No.: PCT/EP2018/083487
§ 371 (c)(1),
(2) Date: May 29, 2020

(87) PCT Pub. No.: WO2019/110587
PCT Pub. Date: Jun. 13, 2019

(65) Prior Publication Data
US 2020/0367697 A1 Nov. 26, 2020

(30) Foreign Application Priority Data
Dec. 4, 2017 (AT) .............................. A 51001/2017

(51) Int. Cl.
*A47J 47/10* (2006.01)
*A23F 3/06* (2006.01)
(Continued)

(52) U.S. Cl.
CPC ................ *A47J 47/10* (2013.01); *A23F 3/06* (2013.01); *B65D 1/10* (2013.01); *B65D 25/04* (2013.01);
(Continued)

(58) Field of Classification Search
CPC .. A47J 47/10; A47J 47/08; A23F 3/06; B65D 1/10; B65D 1/16; B65D 1/14; B65D 1/12;
(Continued)

(56) References Cited

U.S. PATENT DOCUMENTS 2,671,707 A * 3/1954 Lombard ................ A24F 25/02
312/31
3,468,289 A * 9/1969 Broida ................... B65D 25/14
119/6.5
(Continued)

FOREIGN PATENT DOCUMENTS

DE 9206770 U1 * 7/1992 ............. B65D 41/04
DE 9206770 U1 7/1992
(Continued)

OTHER PUBLICATIONS

International Search Report and Written Opinion of the International Searching Authority Application No. PCT/EP2018/083487 Completed: Feb. 25, 2019; dated Mar. 4, 2019 18 pages.
(Continued)

*Primary Examiner* — J. Gregory Pickett
*Assistant Examiner* — Abigail Elizabeth Guidry
(74) *Attorney, Agent, or Firm* — Whitmyer IP Group LLC

(57) ABSTRACT

A storage unit is for storing products that can be affected by humidity, particularly tea. An outer container has a closed outer wall, an upper side on which the outer container is open and has an upper edge, and a lower side on which a closed bottom is arranged. An inner container has an inner space for receiving the product that can be affected by humidity, a wall surface provided with a number of air-exchange openings, a filling opening, a sealing edge defining the filling opening, and a closed bottom. The inner container is reversibly placed in the outer container, the filling opening
(Continued)

of the inner container being upwardly oriented towards the upper side of the outer container.

21 Claims, 7 Drawing Sheets

(51) Int. Cl.
| | |
|---|---|
| B65D 1/10 | (2006.01) |
| B65D 25/04 | (2006.01) |
| B65D 81/18 | (2006.01) |
| B65D 81/26 | (2006.01) |
| A24B 9/00 | (2006.01) |
| A24F 25/00 | (2006.01) |

(52) U.S. Cl.
CPC ........... B65D 81/18 (2013.01); B65D 81/266 (2013.01); *A24B 9/00* (2013.01); *A24F 25/00* (2013.01)

(58) Field of Classification Search
CPC ........ B65D 25/04; B65D 25/28; B65D 81/18; B65D 81/266; B65D 81/26; B65D 81/265; B65D 81/268; B65D 81/267; B65D 81/263; B65D 81/2015; B65D 81/3806; B65D 81/3216; B65D 77/045; B65D 51/30; B65D 88/747; B65D 2519/0086; B65D 5/46; B65D 23/10; A24B 9/00; A24F 25/00; A24F 25/02; A47G 23/02
See application file for complete search history.

(56) References Cited

U.S. PATENT DOCUMENTS

| | | | | |
|---|---|---|---|---|
| 3,994,749 A * | 11/1976 | Decker | ............... | H01M 50/325 429/53 |
| 5,189,581 A * | 2/1993 | Schroder | ................ | G11B 23/50 206/204 |
| 5,215,214 A * | 6/1993 | Lev | .................... | B65D 81/3216 220/502 |
| 5,813,564 A * | 9/1998 | Luo | ...................... | B65D 81/268 206/204 |
| 10,279,966 B1 * | 5/2019 | Solomon | .............. | B65D 85/505 |
| 10,513,375 B2 * | 12/2019 | Karli | ..................... | B65D 25/54 |
| 2005/0061818 A1 * | 3/2005 | Ichikawa | ........... | B65D 81/3216 220/495.06 |
| 2005/0136157 A1 * | 6/2005 | Ebihara | .................. | A23L 23/10 426/120 |
| 2006/0000733 A1 * | 1/2006 | Albritton | ................ | A47J 41/02 206/432 |
| 2006/0102581 A1 * | 5/2006 | Yates, III | ........... | B65D 81/3216 215/6 |
| 2009/0223988 A1 * | 9/2009 | Wichowski | .............. | B65D 1/10 220/796 |
| 2010/0176022 A1 * | 7/2010 | Furlong | ............. | B65D 43/0214 206/508 |
| 2010/0258455 A1 * | 10/2010 | Shay | ...................... | B65D 11/16 206/204 |
| 2011/0127176 A1 * | 6/2011 | Chang | .................. | B65D 43/162 206/204 |
| 2011/0318232 A1 * | 12/2011 | Patcheak | ................. | C01B 3/065 422/129 |
| 2013/0220844 A1 * | 8/2013 | Logel | ................... | B65D 81/266 206/204 |
| 2014/0021206 A1 * | 1/2014 | Vernon | .............. | B65D 81/3216 220/574.1 |
| 2015/0210436 A1 * | 7/2015 | Murray | .................. | B65D 31/12 383/38 |
| 2015/0216230 A1 * | 8/2015 | Loos | ....................... | A24F 15/01 206/256 |
| 2015/0314934 A1 * | 11/2015 | Eberlein | .............. | A45D 33/006 215/243 |
| 2016/0122117 A1 * | 5/2016 | Moore | ................. | B65D 81/268 206/204 |
| 2016/0200499 A1 * | 7/2016 | Dhand | .............. | B65D 81/3222 220/523 |
| 2019/0031422 A1 * | 1/2019 | Lai | .......................... | B01L 3/508 |
| 2019/0241345 A1 * | 8/2019 | Logel | ................... | B65D 81/266 |
| 2019/0276207 A1 * | 9/2019 | Chapman | ............... | B65D 53/02 |
| 2019/0301783 A1 * | 10/2019 | Benbow | ............ | B65D 81/3818 |
| 2021/0093069 A1 * | 4/2021 | Jesberg | .............. | B65D 43/0225 |

FOREIGN PATENT DOCUMENTS

| | | | | |
|---|---|---|---|---|
| EP | 0545810 A1 * | 6/1993 | ............. | B65D 81/18 |
| EP | 0718212 A1 * | 6/1996 | ............. | B65D 81/18 |
| FR | 966606 A * | 10/1950 | ............. | A24F 25/02 |
| FR | 966606 A | 10/1950 | | |
| FR | 2896235 A1 * | 7/2007 | .......... | B65D 81/266 |
| GB | 236512 A * | 2/1925 | ............. | B65D 41/02 |
| GB | 1108263 A * | 4/1968 | ............. | B65D 51/18 |
| JP | S5717670 A | 1/1982 | | |
| WO | WO-9809120 A1 * | 3/1998 | ............. | B65D 81/18 |
| WO | WO-2006066356 A1 * | 6/2006 | ............. | B65D 1/023 |
| WO | WO-2011162621 A1 * | 12/2011 | ............. | A45C 11/20 |
| WO | WO-2012088299 A2 * | 6/2012 | ............. | B65D 81/18 |
| WO | WO-2016188690 A1 * | 12/2016 | ............. | B01D 53/261 |
| WO | WO-2017061743 A1 * | 4/2017 | ............. | B65D 81/18 |
| WO | WO-2018090556 A1 * | 5/2018 | ............. | B65D 1/14 |

OTHER PUBLICATIONS

"Mikken 42168 2 Large Tea Caddy/Storage I in with Additional Aroma Inner Lid Spice Jars Diameter, Metal, Black, 8.3×8.3×8.3 cm with 2 lables 12.6 cm" Aug. 8, 2016; www.amazon.de; Retreved from the Internet: https://www.amazon.de/dp/B01K284PXC/ref=cm_sw_em_r_mt_dp_U_QZQBCbFEJ35GA Retrieved on May 29, 2020.

* cited by examiner

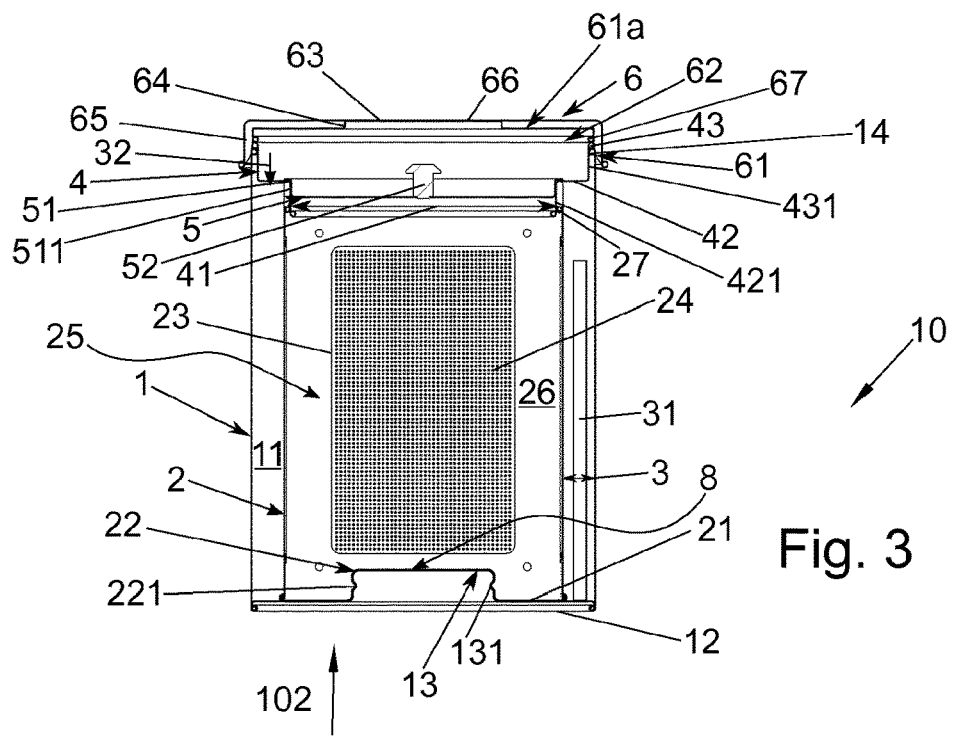
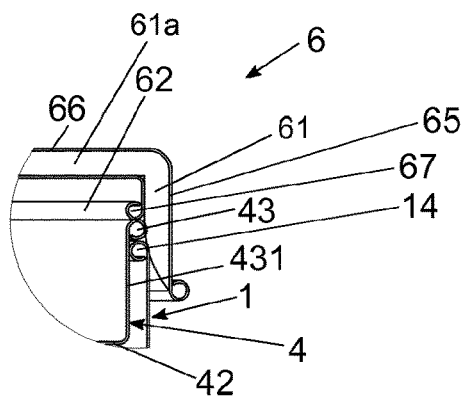
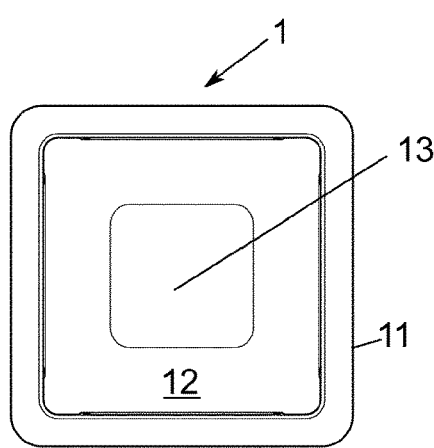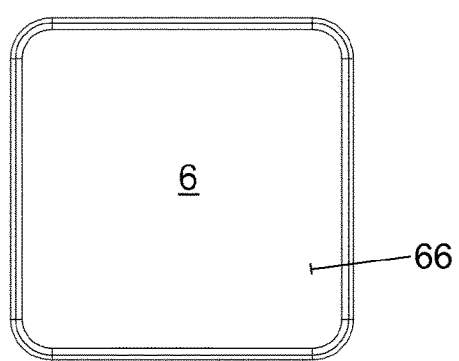

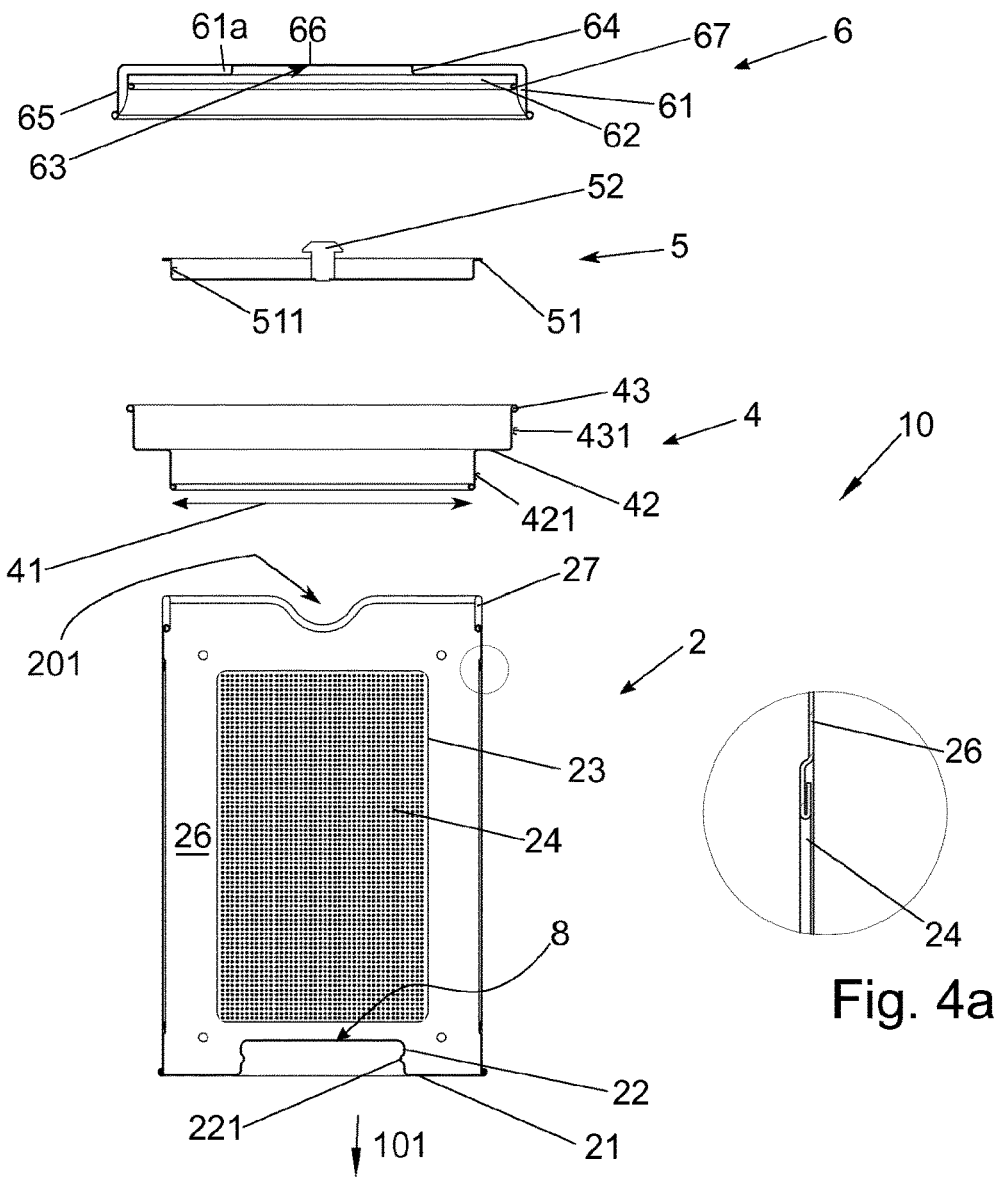
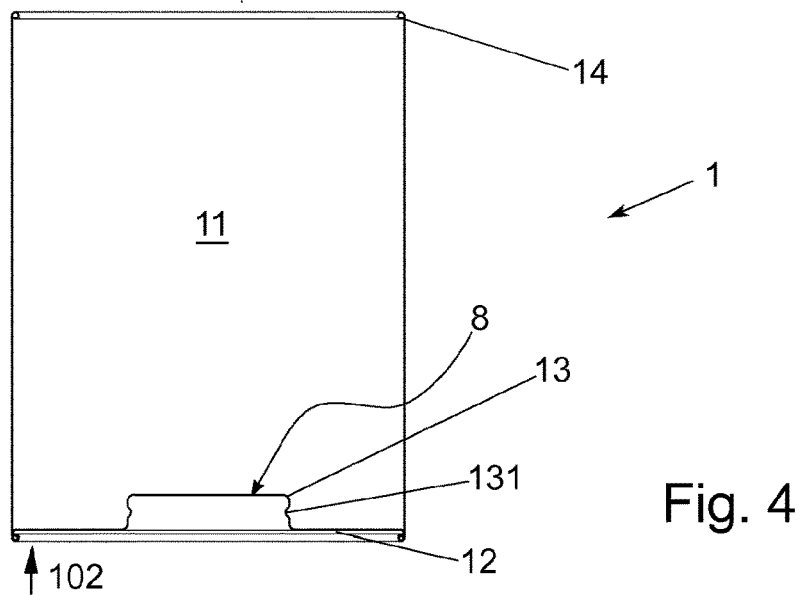
Fig. 4a
Fig. 4

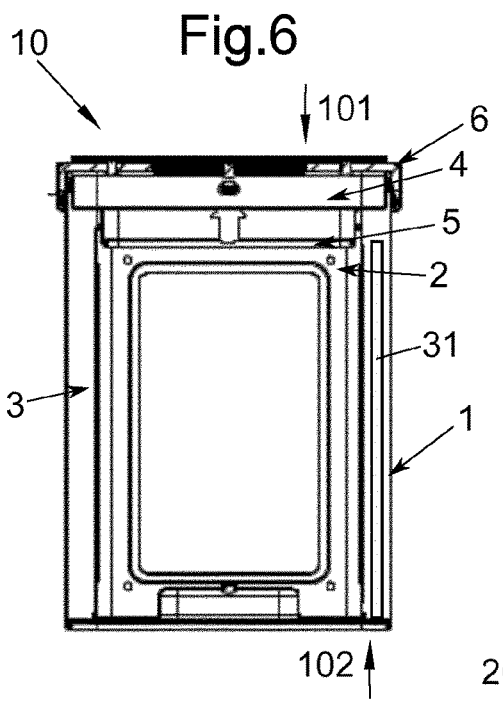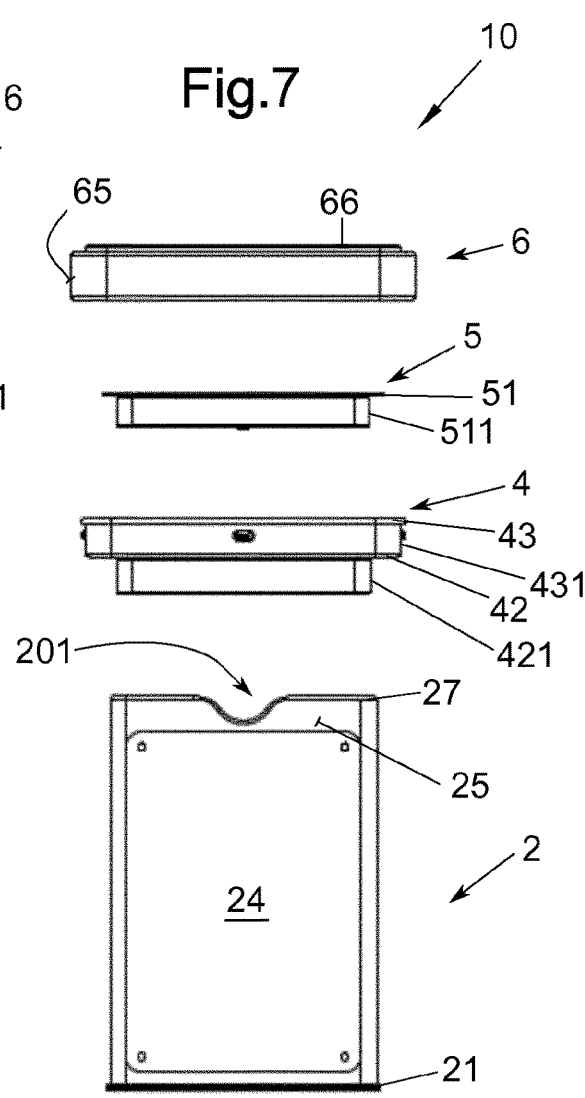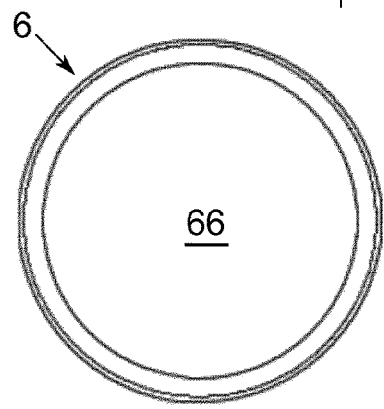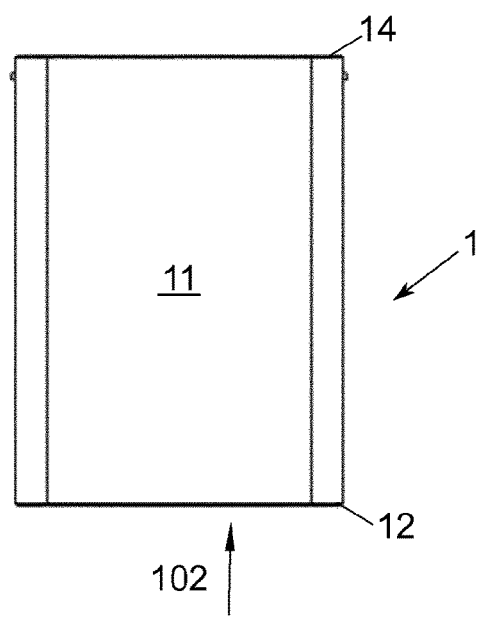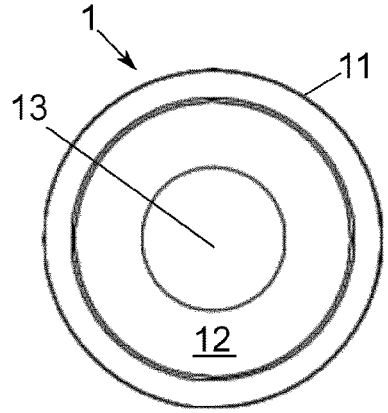

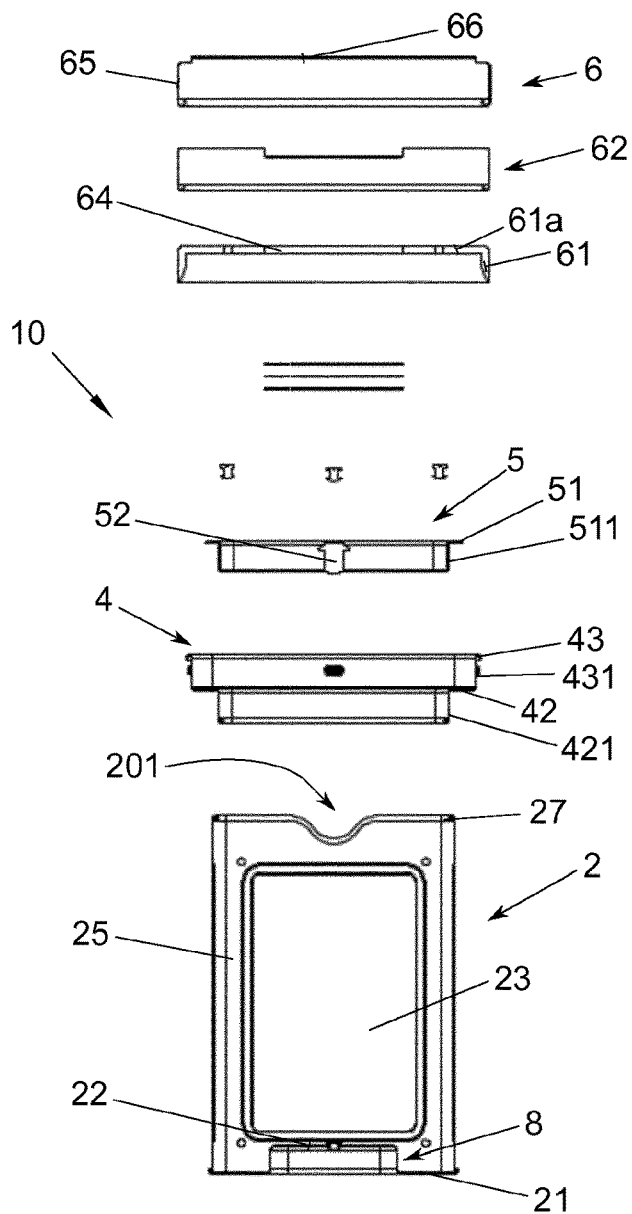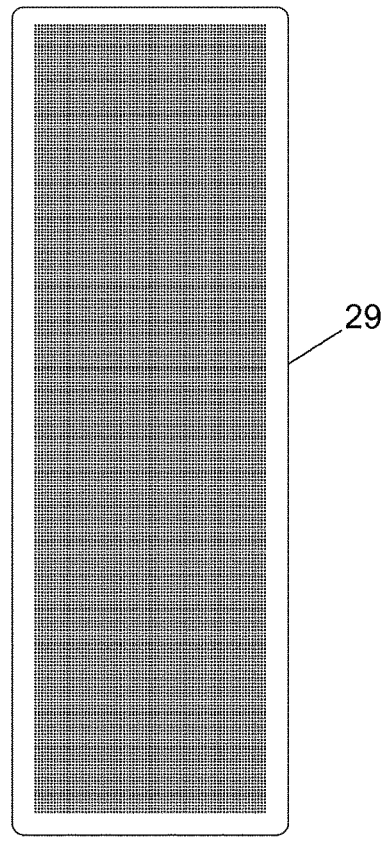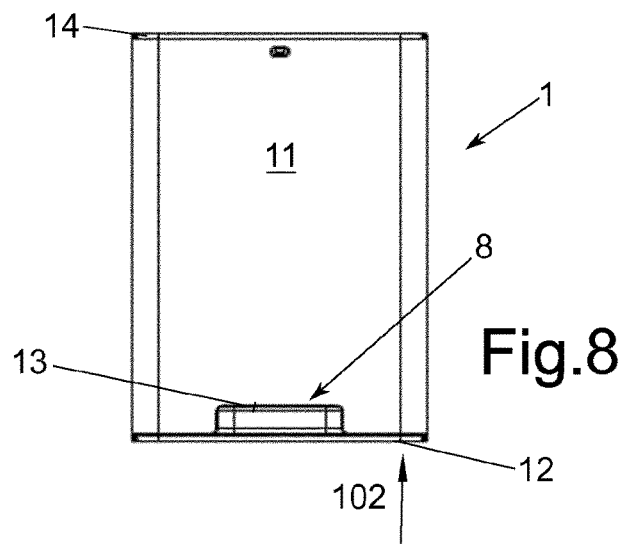

STORAGE UNIT FOR STORING PRODUCTS THAT CAN BE AFFECTED BY HUMIDITY

TECHNICAL FIELD

The present teaching relates to a storage unit for storing products that can be affected by humidity.

BACKGROUND

Products in the nutrition, food, beverage and tobacco industries that can be affected by humidity, such as herbs, spices, teas, caviar, truffles, gourmet cheese, delicatessen and meat products as well as cigars or tobacco, require storage under uniform atmospheric conditions and a constant degree of humidity in order to preserve their specific aroma, their special flavor, and their special consistency and texture throughout the storage period.

Simply constructed storage units, such as tea canisters for instance, are well known in the prior art. The disadvantage of storage units of that type is that they are not appropriate for maintaining uniform atmospheric conditions and a constant degree of humidity, and thus products that can be affected by humidity quickly lose their specific properties when stored in them. In addition, well-known storage units such as humidors for tobacco products can maintain constant humidity of preserved tobacco products, for instance with the help of complex humidifying systems.

SUMMARY

It is therefore one object of the present teaching to provide a simply constructed, easily handled storage unit, which maintains a constant degree of humidity in stored products, which protects products against air, odors and contaminants penetrating into the storage unit, and simultaneously allows for simple insertion of the products that can be affected by humidity.

The present teaching fulfills this object by means of a storage unit of the aforementioned type, comprising:

an outer container comprising a closed outer wall, an upper side on which the outer container is open and has an upper edge, and a lower side on which a closed bottom is arranged, an inner container having an inner space for receiving the product that can be affected by humidity, a wall surface provided with a number of air-exchange openings, a filling opening, a sealing edge defining the filling opening, and a closed bottom, the inner container being reversibly placed in the outer container, the filling opening of the inner container being upwardly oriented towards the upper side of the outer container, and an intermediate space for the insertion of a humidity-regulating means being formed between the outer container and the inner container, a reversibly removable covering frame that can be placed on the outer container and the inner container and extends all the way around the upper edge and the sealing edge, the covering frame being designed to cover the opening of the intermediate space between the outer container and the inner container, a frame opening for accessing the inner space being provided in the covering frame, a reversibly removable inner sealing cover for closing the frame opening, which can be placed on the covering frame, and a detachable outer sealing cover for closing the outer container or the upper side of the outer container in an airtight manner.

The sluice-type double covering system assures that the storage unit is shielded by the outer sealing cover from penetration by air, humidity and odors, while the humidity-regulating means, for example a pouch or packet filled with a drying agent, maintains a constant degree of humidity in the storage unit. The inner sealing cover assures that the stored products, for example tea, are not exposed to the ambient atmosphere in the event that the outer sealing cover is inadvertently removed.

In order to store the humidity-regulating means securely in an inventive storage unit without it being visible to a user upon opening the storage unit, the covering frame can be provided with a first tier that engages in the inner container, configuring a first surrounding contact surface, which can be mounted on the closing edge of the inner container and upon which the inner sealing cover can be placed.

This configuration of the present teaching also guarantees that stored tea cannot fall into the intermediate space in which the humidity-regulating means is located.

To guarantee that the outer sealing cover is situated securely on the storage unit, the covering frame can comprise a second tier that engages in the outside container, configuring a second surrounding contact surface that can be placed on the upper edge of the outer container.

To adjust the shape of the inner sealing cover as well as possible to the covering frame so that the inner sealing cover sits securely on the covering frame in the event that the storage unit tips, the inner sealing cover can comprise a depression adjusted to the first contact surface, thus forming an outward-facing, completely surrounding protrusion.

In addition, this configuration of the inner sealing cover guarantees that no tea can escape from the inner container in the event that the storage unit should tip over.

To guarantee a means of saving space in storing several inventive storage units, such as by stacking them, the outer sealing cover can comprise a sealing surface that seals the upper side of the outer container and a completely surrounding bending surface, allowing the outer sealing cover to be placed on the outer container in such a way that the upper edge area of the outer wall of the outer container is surrounded by the bending surface, and so that the sealing surface and bending surface are preferably configured as level.

For air-tight and in some cases water-tight sealing of the storage unit, the outer sealing cover on the side of the bending surface facing the inner space can comprise a first seal that can be affixed to completely surround the covering frame and the outer container, and if necessary a second seal is applied on the side of the sealing surface facing the inner space.

For durable fixing and protection of the second seal, disposed on the sealing surface of the outer sealing cover, a covering element, at least partially covering the second seal, can be arranged on a side of the second seal facing the inner space.

Durable fixing of the second seal to the sealing surface can be guaranteed if the covering element comprises an indentation and the second seal has a seal recess corresponding thereto, the base surface of the insulating element corresponding to the base surface of the indentation, so that the covering element can be placed in the region of the insulating recess contiguously with the outer sealing cover.

To prevent the covering element from unintentionally being released from the outer sealing cover, a completely surrounding flanged edge can be provided on the covering element, so that said flanged edge, in mounting the covering element onto the second seal situated on the sealing surface, can expand to brace the covering element against the first seal and the bending surface of the outer sealing cover.

For especially flexible configuration of an inventive storage unit to meet a user's needs for problem-free storage in cabinets or drawers, it is possible to arrange that the outer container and the outer sealing cover and the second seal and the covering element and a portion of the covering frame situated on the outer container comprise a rectilinear or square or circular or elliptical cross-section.

To design an inventive storage unit for storing products of various sizes and/or shapes, it can be arranged that the inner container and/or the inner sealing cover and/or a portion of the covering frame situated on the inner container have a rectilinear or square or circular or elliptical cross-section.

It is possible to guarantee especially easy insertion of the inner container for storing products that can be affected by humidity into the storage unit, and to remove it from said storage unit, while simultaneously maintaining very constant overall atmospheric humidity, if the outer container and/or the inner container is of square or cylindrical configuration.

To produce a constant internal atmosphere in the storage unit, it can be arranged that the air-exchange openings for atmospheric exchange are configured between the inner space and the intermediate space, so that in the inner space and in the intermediate space a uniform internal atmosphere with a desired degree of humidity can be selected.

By means of this configuration of the air-exchange openings, atmospheric exchange can occur between the inner space, in which the tea is situated, and the intermediate space, in which the humidity-regulating means is located. A uniform degree of humidity is thereby selected in the inner space and in the intermediate space.

Another embodiment of the present teaching, offering the possibility of using microscopic perforations as an alternative to the air-exchange openings, can be provided if the inner container comprises at least one recess with a perforated layer element, in which the air-exchange openings are made, covering the recess.

By providing the perforated layer element, not even the smallest fragments of stored tea leaves can penetrate into the intermediate space, while efficient atmospheric exchange is assured between the inner space and the intermediate space.

To allow the perforated layer elements to be mounted in a durable, stable manner on the inner container, the inner container can take the form of a frame construction, said inner container, on each of its side surfaces, comprising openings over which perforated layer elements are placed.

Especially fine perforations can be used for air exchange between the inner space and the intermediate space if the perforated layer elements are constructed of a steel alloy.

It is possible to assure especially corrosion-resistant and simultaneously light configuration of the storage unit if the outer container and/or the outer sealing cover and/or, in some cases, the wall surface of the inner container and/or the inner sealing cover are made of a type of tin plate.

To fix the inner container when it is inserted into the outer container, it is possible to provide connecting means, especially of a mechanical nature, to produce a reversibly releasable operative connection between the outer container and the inner container in the bottom of the outer container and/or in the bottom of the inner container, said connecting means being preferably placed in a centered position.

An especially stable operative connection can be established between the inner container and the outer container if a first indentation is provided in the bottom of the outer container and if a second indentation, corresponding with the first indentation, is provided in the bottom of the inner container so that a mechanical operative connection can be established.

To fix the inner container in position especially securely, the first indentation and the second indentation can be spherical, ellipsoid or square in configuration, a first undercutting, in particular, being provided in the first indentation and a second undercutting, corresponding to it, being provided in the second indentation, so that the inner container can be locked in place in the outer container by being mounted on said outer container.

To provide a constant width for the intermediate space configured between the outer container and the inner container, the indentation wall surfaces of the first indentation and of the second indentation can be aligned parallel to the outer wall surfaces of the first container.

Providing undercuttings to lock the inner container inside the outer container, and parallel alignment of the indentation wall surfaces with the outside wall surfaces of the outer container, have the second advantage that the humidity-regulating means or packets with drying means cannot slip along the walls of the outer container and can easily be replaced by way of the opening of the intermediate space facing the upper site.

Easy removal of the inner sealing cover can be guaranteed if a hand grip is provided on a side of the sealing cover facing away from the inner space.

A special storage unit which is especially easy to grip and to stack can be provided if the outer container and the inner container are of cylindrical shape, if the outer sealing cover and a portion of the covering frame mounted on the first container are circular in cross-section and if the inner sealing cover and a portion of the covering frame mounted on the inner container are circular in cross-section.

Especially effective air exchange between the inner space and the intermediate space is possible if the wall surface of the inner container is constructed of a perforated wall element, said perforated wall element comprising a number of air-exchange openings.

Additional advantages and configurations of the present teaching can be found in the description and the appended drawings.

Embodiments of the present teaching, which are particularly advantageous but not to be considered restrictive, are presented schematically hereinafter in the appended drawings and are described with reference to the drawings by way of example:

BRIEF DESCRIPTION OF THE DRAWINGS

Reference is made to the following schematic depictions.

FIG. 3 shows a sectional view across the first embodiment.

FIG. 3a shows a detail view of the first embodiment.

FIG. 3b shows a view in the direction of the bottom of the outer container.

FIG. 3c shows a view of the outer sealing cover.

FIG. 4 shows a second explosion drawing of the first embodiment.

FIG. 4a shows another detail view of the first embodiment.

FIG. 6 shows a sectional depiction across a second embodiment.

FIG. 6a shows a view in the direction of the bottom of the outer container of the second embodiment.

FIG. 6b shows a view of the outer sealing cover of the second embodiment.

FIG. 7 shows a first explosion drawing of the second embodiment.

FIG. 8 shows a second explosion drawing of the second embodiment.

FIG. 9 shows a detail view of a perforated wall element.

DETAILED DESCRIPTION

Figure 1:
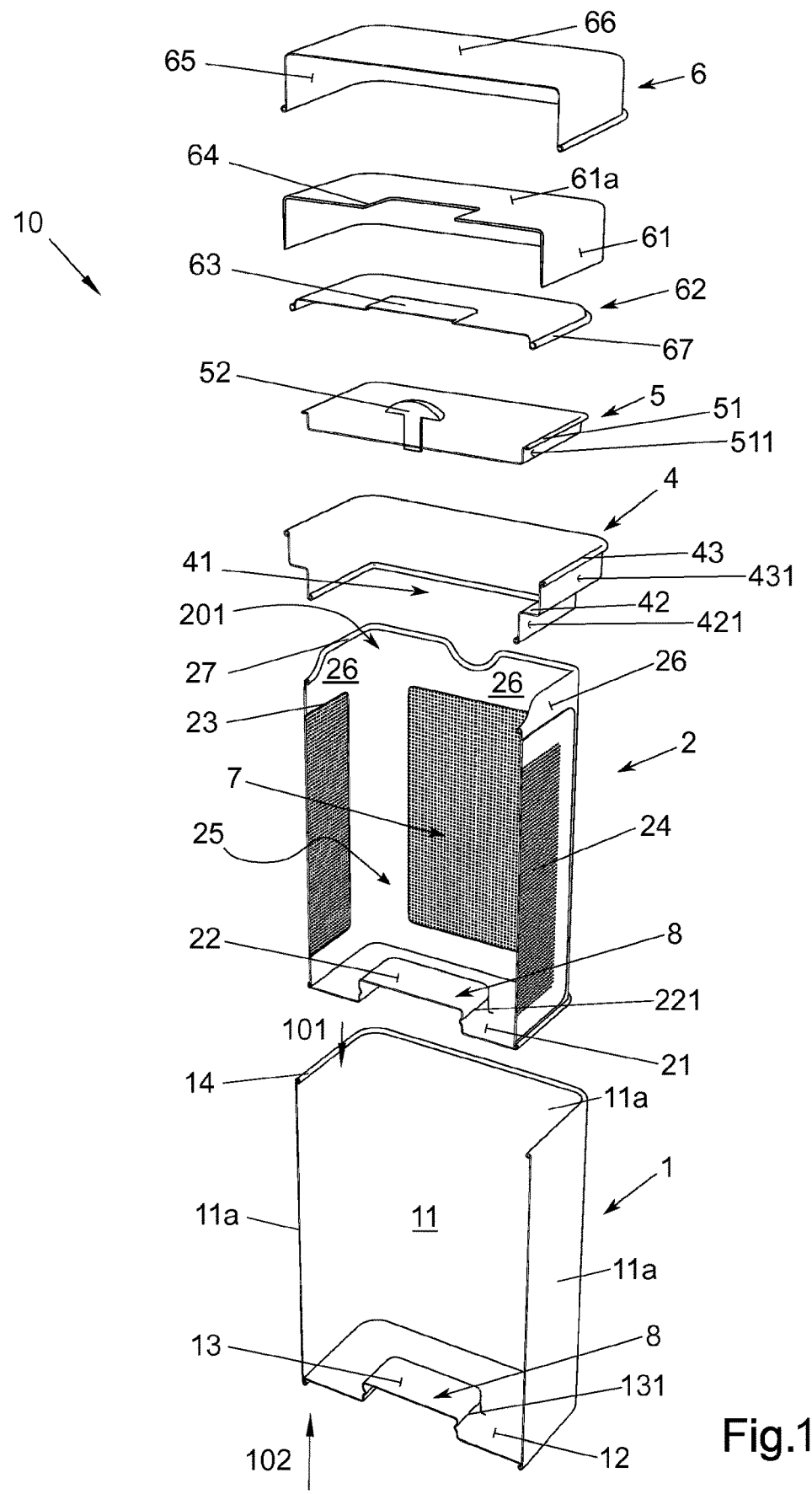
FIG. 1 shows an explosion view of a first embodiment of the present teaching.

FIG. 1, FIG. 2, FIG. 3, FIG. 4 and FIG. 5 show perspective views of a first embodiment of a storage unit 10. FIG. 1, in addition, shows a sectional view through a first embodiment of the present teaching as an explosion drawing, FIG. 2 a sectional view through the first embodiment of the present teaching in assembled state in the form of a perspective view, FIG. 3 an elevation view of the first embodiment of the present teaching in assembled state, FIG. 4 a sectional view through the first embodiment of the present teaching in the form of an explosion drawing, and FIG. 5 an external view of the first embodiment of the present teaching in the form of an explosion drawing.

In the first embodiment in FIG. 1, FIG. 2, FIG. 3, FIG. 4, and FIG. 5 the inventive storage unit 10 comprises an outer container 1, an inner container 2, a covering frame 4, an inner sealing cover 5, and an outer sealing cover 6. The outer container 1 comprises a closed outer wall 11, an upper side 101 oriented upwards during normal operation, and a lower side 102 oriented downwards during normal operation. On the upper side 101 the outer container 1 is open and comprises an upper edge 14. On the underside 102 a closed bottom 12 is present on the outer container 1.

In the illustrated first embodiment the outer container 1 comprises a square cross-section surface, so that the outer wall 11 of the outer container 1 includes four outer wall surfaces 11a. The upper edge 14 is configured in the first embodiment as a flanged edge facing into the inside of the outer container 1; alternatively the flanged edge can also be oriented outwards. Alternatively the upper edge 14 can also be configured as a simply configured closing edge without any decorative element or flanged edge.

The inner container 2 comprises an inner space 7 for receiving the product that can be affected by humidity, for example tea. Said inner space also comprises, in the first embodiment, a wall surface 25 with a number of air-exchange openings 28 and has a closed bottom 21. The air-exchange openings 28 are visible in detail in FIG. 2 and are shown as black points in FIG. 1, FIG. 3, FIG. 4, and FIG. 5. The air-exchange openings 28 are configured for atmospheric exchange between the inner space 7 and the intermediate space 3, so that a uniform interior atmosphere with a particular degree of humidity can be selected in the inner space 7 and in the intermediate space 3.

A filling opening 201 is arranged opposite the closed bottom 21 of the inner container 2, said filling opening 201 being defined by a sealing edge 27. In the first embodiment the inner container 2 has a square cross-section surface, so that the wall surface 25 is divided into four side surfaces 26. Each of the side surfaces 26 of the inner container 2 comprises a recess 23 on which perforated layer elements 24 are arranged, the inner container 2 being configured as a frame construction.

In the first embodiment the perforated layer elements 24 are constructed of a steel alloy and comprise a high number of air-exchange openings 28, and the frame construction of the inner container 2 and the outer container 1 are constructed of tin plate.

The inner container 2 can be reversibly inserted into the outer container 1, so that the upper side 101 of the outer container 1 and the filling opening 201 of the inner container 2 are arranged with respect to one another in such a way that products that can be affected by humidity can be introduced into the inner space 7. In this arrangement of the outer container 1 and of the inner container 2, an intermediate space 3 is configured between the outer container 1 and the inner container 2 for inserting a humidity-regulating means 31.

The first embodiment includes connecting elements 8 in the bottom 12 of the outer container 1 and in the bottom 21 of the inner container 2 for producing a reversibly releasable operative connection between the outer container 1 and the inner container 2. The connecting means 8 here are in a centered position in the bottom 12 of the outer container 1 and in the bottom 21 of the inner container 2 and configured as mechanical connecting means.

The bottom 12 of the outer container 1 here contains a first indentation 13, which is of square configuration and comprises a first undercutting 131. The first indentation 13 here is turned inwards, that is, turned away from the underside 102 of the outer container 1 in the direction of the upper side 101. Configured in the bottom 21 of the inner container 2 is a second indentation 22, which, like the first indentation 13 of the outer container 1, is of square configuration and corresponds with the latter, as can be seen in FIG. 1 and FIG. 4.

The second indentation 22 includes a second undercutting 221, which corresponds with the first undercutting 131 of the first indentation 13, so that the inner container 2 can be locked in the outer container 1 by being placed on the outer container 1 and an operative connection can be produced. This assures an especially good fixation of the inner container 2 in the outer container 1. Alternatively the first indentation 13 and the second indentation 22 can also be configured without an undercutting or can comprise an ellipsoid or spherical base surface.

Figure 2:
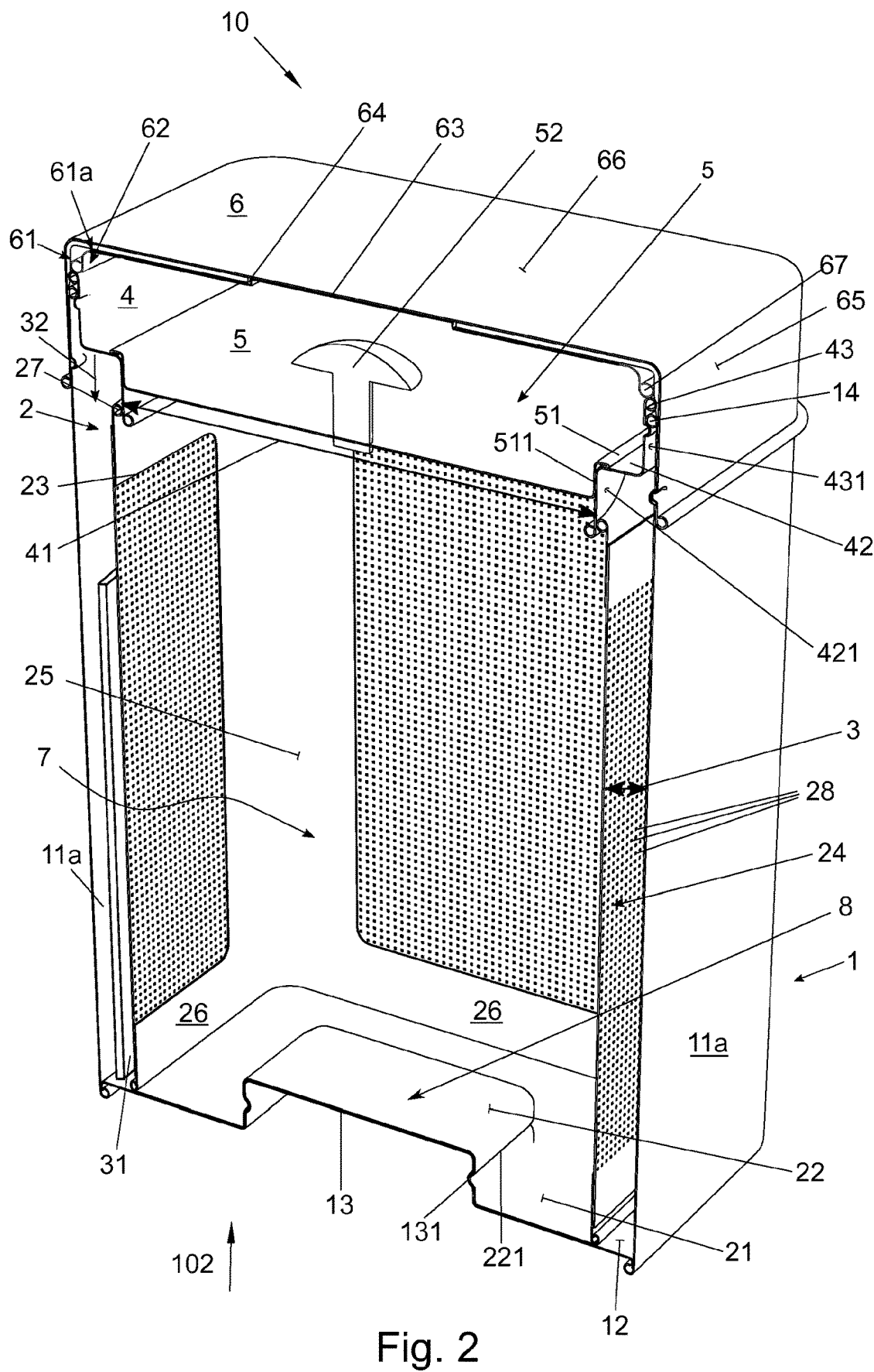
FIG. 2 shows a diagonal view of the first embodiment.
Figure 5:
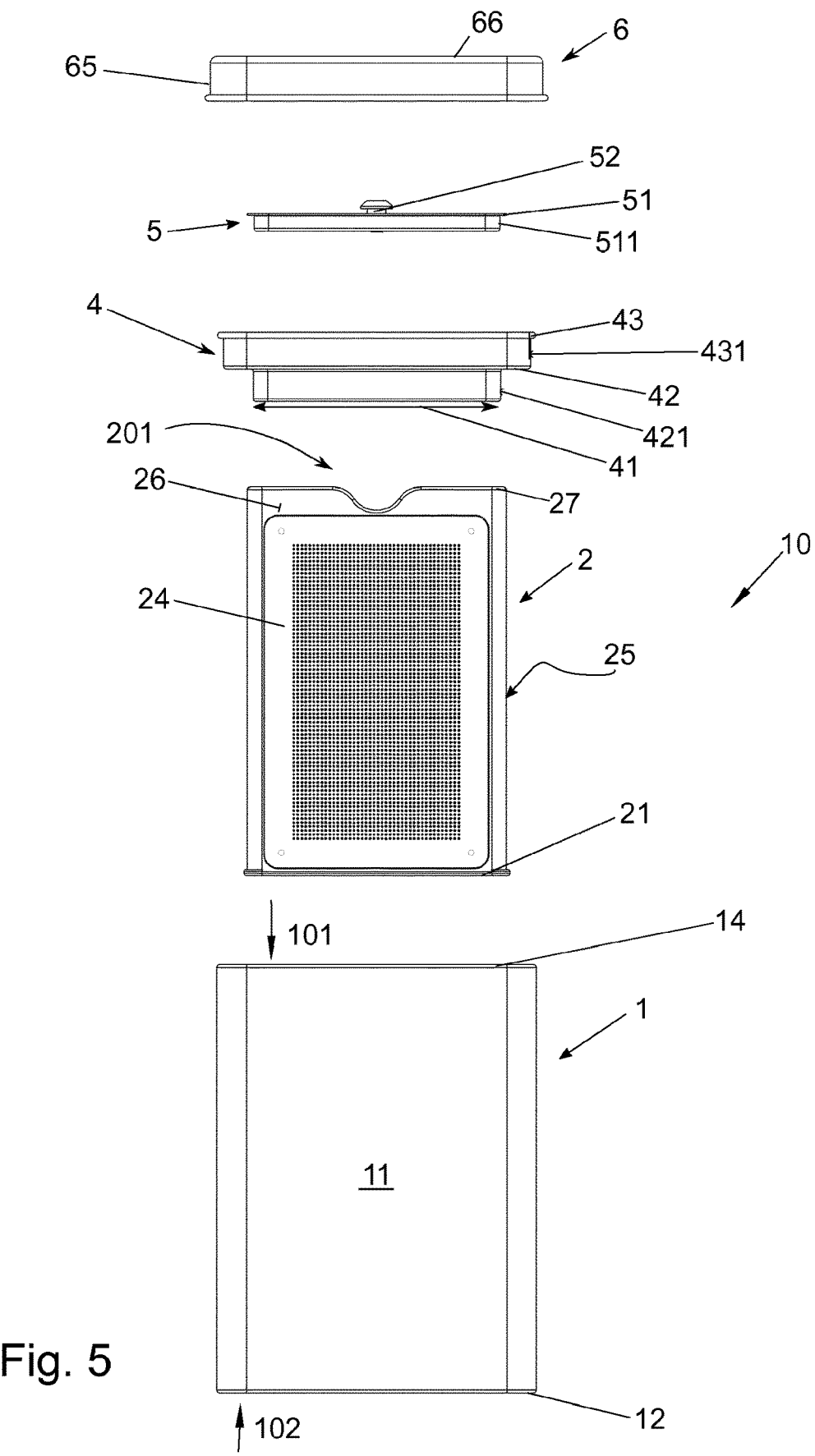
FIG. 5 shows a third explosion drawing of the first embodiment.

In the first embodiment, in addition, the first indentation 13 and the second indentation 22 comprise smooth indentation walls, which guarantee that the outer wall surfaces 11a of the outer container 1 are aligned parallel to the side surfaces 26 of the inner container 2, as can be seen in FIG. 2.

The storage container 10, in addition, includes a covering frame 4, which can be reversibly removed and mounted on the outer container 1 and the inner container 2. The covering frame 4 extends completely around the periphery of the outer container 1 and the inner container 2 and is configured to cover the opening 32 of the intermediate space 3 that is configured between the outer container 1 and the inner container 2.

The covering frame 4 includes a frame opening 41 for accessing the inner space 7, which leaves the filling opening 201 of the inner container 2 free so that tea, for example, can be introduced into the inner space 7 of the inner container 2.

The covering frame 4 here is of double-tiered configuration and comprises a first tier 421 engaging in the inner container 2, to configure a first surrounding contact surface 42. The contact surface 42 can be mounted on the sealing edge 27 of the inner container 2. The covering frame 4, in addition, comprises a second tier 431 engaging in the outer container 2, to configure a second surrounding contact surface 43. The second contact surface 43 can be placed on the upper edge 14 of the outer container 1.

The arrangement of the inner container 2 with perforated layer elements 24, in which air-exchange openings 28 are provided, inside an outer container 1 guarantees that the products that can be affected by humidity are safely stored in the inner space 7 of the inner container 2 without any possible contact with the humidity-regulating means 31 in the intermediate space 3 or the outer container 1.

The air-exchange openings 28, by means of the humidity-regulating means, guarantee the equalization of air and humidity between the inner container 1 and the intermediate space 3. As a result, uniform interior atmosphere and a determined degree of humidity can be selected in the inner space 7, enabling adequate storage of the products that can be affected by humidity, especially tea. The air-exchange openings 28 here are adjusted to such a small size that no components of the tea can penetrate the outer container 1 or the intermediate space 3 or that humidity-regulating means 31 can reach the inner space 7 when a granular humidity-regulating means 31 is utilized.

The covering frame 4 assures that, in filling the inner container 2 with tea or in removing the tea from the inner space 7, no components of the tea can fall into the intermediate space 3 or into the outer container 1. The covering frame 4 further assures that the humidity-regulating means 31 can be replaced without requiring the tea in the inner space 7 of the inner container 2 to be removed or touched.

The intermediate space 3 of the storage unit 10, as shown in FIG. 2 and FIG. 3, has room for as many as four pouches with humidity-regulating means 31 along the wall surfaces 11a or the side surfaces 26. As a result, for example, the desired degree of humidity can be obtained by varying the number of pouches with humidity-regulating means 31 and a uniform internal atmosphere is guaranteed over a fairly extensive time frame. Alternatively, granular humidity-regulating means 31, for example, can also be added in the intermediate space 3.

In addition, in the first embodiment, the storage unit 10 includes a reversibly removable inner sealing cover 5, which can be mounted on the covering frame 4. The sealing cover 5 serves to seal the frame opening 41 or the filling opening 201 of the inner container 2, so that no tea can fall out of the inner space 7 of the inner container 2 and also no impurities can penetrate into the tea.

The inner sealing cover 5 here can be mounted on the first contact surface 42 of the covering frame 4 and comprises an indentation 511, which is adjusted to the first contact surface 42, so that an outward-pointing, completely surrounding protrusion 51 is formed. Said protrusion 51 guarantees that the inner sealing cover 5 can be fixed on the covering frame 4, so that the inner sealing cover 5 cannot accidentally fall down, for instance if the storage unit 10 is tipped. The inner sealing cover 5, in addition, comprises a grip 52 on its side facing away from the inner space 7, so that the inner sealing cover 5 can be easily grasped and removed from the covering frame 4.

In the first embodiment the storage unit 10, in addition, comprises a removable outer sealing cover 6 for sealing the outer container 1 or the upper site 101 of the outer container 1. The outer sealing cover 6 seals the outer container 1 in an airtight and, if necessary, watertight manner, so that no humidity or odors can penetrate into the storage unit 10 and damage the stored products that can be affected by humidity, such as tea.

The arrangement of an inner sealing cover 5 and in addition an outer sealing cover 6 further guarantees that, if the outer sealing cover 6 should happen to be accidentally pulled off the storage unit 10, the inner sealing cover 5 can still protect the tea stored in the inner space 7 from impurities and, in some cases, air and humidity.

The outer sealing cover 6 in the first embodiment comprises a sealing surface 66 that seals the upper site 101 of the outer container 1 and a completely surrounding bending surface 65, which is mounted externally on the sealing surface 66 and is bent downwards almost at a right angle. The sealing surface 66 and the bending surface 65 of the outer sealing cover 6, in the first embodiment, are level in configuration and, when the outer sealing cover 6 is mounted on the outer container 1, the bending surface 65 surrounds the upper edge region of the outer wall 11 of the outer container 1, as shown in FIG. 2 and FIG. 3.

The outer sealing cover 6, in the first embodiment, is particularly configured as airtight, and in some cases watertight, in that a first seal 61 is mounted on the side of the bending surface 65 facing towards the inner space 7. The first seal 61 can be mounted to surround the covering frame 4 and on the outer container 1; that is, when the outer sealing cover 6 is applied, the first seal 61 surrounds the outer container 1 and the portion of the covering frame 4 extending over the first container 1. As a result, no odors or air humidity from outside can penetrate into the storage unit 10 or into the outer container 1.

In addition, for particularly airtight and, in some cases, watertight configuration of the outer sealing cover 6, a second seal 61a is arranged on the side of the sealing surface 61 facing the inner space, as can be seen in FIG. 1.

The storage unit 10 also includes, in the first embodiment, a covering element 62 that is mounted on a side of the second seal 61a facing the inner space 7 and at least partly covers the second seal 61a. In the embodiment the second seal 61a is completely covered by the covering element 62, said covering element 62 comprising an indentation 63.

The indentation 63 in the first embodiment, as shown in FIG. 1, is of square configuration and is positioned centered in the covering element 62, and the second seal 61 comprises an insulating recess 64 corresponding with the lowered section 63. The covering element 62 serves here to fix the first seal 61 or the second seal 61a in the outer sealing cover 6.

The base surface of the insulating recess 64 corresponds to the surface of the indentation 63, so that the covering element 62 can be situated contiguously with the outer sealing cover 6 in the region of the insulating recess 64. In order to fix the first seal 61 and the second seal 61a especially durably in the outer sealing cover 6, in the first embodiment a cementing agent is applied on the indentation 63 of the covering element 62, so that the covering element 62 is durably secured on the outer sealing cover 6. Any slipping or falling of the first seal 61 and of the second seal 61a out of the outer sealing cover 6 is thereby prevented.

In addition, the covering element 62 in the first embodiment comprises a completely surrounding flanged edge 67, which expands when the covering element 62 is mounted on the second insulation 61a arranged on the sealing surface 66 in order to fasten the covering element 62 against the first seal 61 and the surrounding surface 65 of the outer sealing cover 6. The flanged edge 67 in the first embodiment is curved in the direction of the outer sealing cover 6, assuring a particularly easy expansion.

Alternatively, the covering element 62 can also be expanded against the first seal 61 in the outer sealing cover 6 without cement, merely with the help of the flanged edge 67, so that sufficient fixing of the first seal 61 and of the second seal 61a in the outer sealing cover 6 is likewise guaranteed.

Optionally, the covering element 62 can also be configured without an indentation 63, the first seal 61a in this case not comprising any seal recess 64 corresponding with the indentation 63a.

Alternatively, the covering element 62 can also completely cover the first seal 61 and the second seal 61a and expand in the lower region of the bending surface 65 of the outer sealing cover 6, with a flange edge 67 arched in the direction of the sealing cover 6, said region being distant from the sealing surface 65.

FIG. 2, by way of example, depicts the arrangement of a pouch with humidity-regulating means in the intermediate space 3. FIG. 2 also indicates that layer elements 24 are arranged on the recesses 23 of the side surfaces 26, having air-exchange openings 28 in the form of micro-perforations, which are fine enough to independently retain the smallest tea components in the inner space 7, so that they cannot advance into the intermediate space 3 to the humidity-regulating means 31. An exchange of air and humidity between the inner space 7 and the intermediate space 3 with the humidity-regulating means 31 is, however, possible without any difficulty.

In the illustrated embodiment, recesses 23 are present in all side surfaces 26 of the inner container 2 and perforated layer elements 24, which close the recesses 23, so that an optimal atmosphere exchange is guaranteed between the inner space 7 and the intermediate space 31. Alternatively, for example, recesses 23 can be arranged only on two side surfaces 26, or air-exchange openings 28 can be arranged directly in the wall surface 25 of the inner container 2.

The perforated layer elements 24 here are constructed of a steel alloy, which allows problem-free production of micro-perforations. The outer container 1 and the wall surface 25 of the inner container 2 in the first embodiment are of tin plate. The outer sealing cover 6 and/or the inner sealing cover 5 likewise are made of a type of tin plate.

FIG. 2 further shows that the covering frame 4, with the storage unit 10 in its assembled form, completely covers the opening 32 of the intermediate space 3 configured between the outer container 1 and the inner container 2. As a result, for a user of the storage unit 10, for example, the pouches with humidity-regulating means 31 are not visible when he or she adds tea to the inner space 7 of the inner container 2 or removes tea from it. The covering frame 4 needs only to be removed, for example, in order to remove humidity-regulating means 31 from the intermediate space 3 or in order to replace the humidity-regulating means 31.

In addition, small tea leaves can fall into the intermediate space 3 during insertion or removal of tea in the inner space 7 of the inner container 2. The covering frame 4 reduces, in addition, the surface through which harmful humidity, air, light or odors can penetrate into the outer container 1 and the inner container 2, in which tea is contained. Simultaneously, as a result, the lifetime of the humidity-regulating means 31 is increased.

FIG. 2 also shows how the first indentation 13 and the second indentation 22 interlock or engage with one another in order to center and lock in place the inner container 2 and the outer container 1. Thus it becomes impossible to rotate the inner container 2 in the outer container 1 and, for example, pouches with humidity-regulating means 31 are left in a uniformly wide intermediate space 3 so that the humidity-regulating means 31 can be easily inserted and removed.

The sealing surface 66 of the outer sealing cover 6 and the bottom 12 of the outer container 1 are of level configuration, so that several inventive storage units 10 can be stacked upon one another without problem. Here it is possible to arrange on the bottom 12 of the outer container 1 a completely surrounding flanged edge, outside on the bottom 12 of the outer container, which in stacking storage units 10 guarantees that in each case the bottom 12 of an outer container 1 of a storage unit 10 is securely fixed on the outer sealing cover 6 of an additional storage unit 10 arranged beneath it. In addition, FIG. 2 also shows that the hand grip 52 of the inner sealing cover 5 does not touch the covering element 62, so that the covering element 62 and the second seal 61a are not inadvertently damaged by the grip 52 or pulled off of the sealing cover 6.

FIG. 3a shows a detail view in the region of the outer sealing cover 6 and of the upper edge 14 of the outer container 1 of the first embodiment of the present teaching. It can be seen in FIG. 3a that the second seal 61a completely covers the sealing surface 66 of the outer sealing cover 6, and that the bending surface 65 of the outer sealing cover 6 is completely covered by the first seal 61.

The first seal 61 here extends in wedge shape downward, that is, in the direction of the outer sealing cover 6 turned away from the sealing surface 66. The flanged edge 67 of the covering element 62 expands against the first seal 61, and the second contact surface 43 of the covering frame 4, which is configured in the embodiment as a flanged edge, likewise expands against the first seal 61. In addition, FIG. 3a shows that the upper edge 14 of the outer container 1 likewise expands against the first seal 61. This guarantees that the storage unit 10 is sealed in airtight and likewise water-tight manner when the outer sealing cover 6 is mounted on the outer container 1.

FIGS. 3b and 3c present overhead views of the first embodiment of the present teaching, in which FIG. 3b shows an overhead view in the direction of the bottom 12 of the outer container 1 and FIG. 3c an overhead view in the direction of the outer sealing cover 6. It can thus be seen that in the first embodiment the outer container 1 and the outer sealing cover 6 comprise a square cross-section. Thus the outer wall 11 of the outer container includes four identically configured wall surfaces 11a.

The first indentation 13 likewise has a square cross-section and is arranged in a centered position in the bottom 12. In the first embodiment, the second seal 61a, the covering element 62, and a portion of the covering frame 4 positioned on the outer container 1 likewise comprise a square cross-section.

Alternatively, the outer container 1, the outer sealing cover 6, the second seal 61a, the covering element 62, and a portion of the covering frame 4 positioned on the outer container 1 can have a rectilinear, circular or elliptical cross-section.

The inner container 2 and the inner sealing cover 5 as well as a portion of the covering frame 4 positioned on the inner container 2 in the first embodiment of the present teaching comprise a square cross-section.

Alternatively, the inner container 2, the inner sealing cover 5 and the portion of the covering frame 4 positioned on the inner container 2 can have a rectilinear, circular or elliptical cross-section In the first embodiment the outer container 1 and the inner container 2 are of square configuration. Alternatively, the outer container 1 and the inner container 2 can also be cylindrical in shape. Thus it is possible, for example, that a cylindrical inner container 2 with a circular cross-section is situated within a rectilinear outer container 1 having a square cross-section.

FIG. 4a shows a detail view in the region of a recess 23 in a side surface 26 of the inner container 2 in a cross-section. It can be seen here that a perforated layer element 24 is fixed on the side surface 26 and seals the recess 23 in the side surface 26.

An inventive storage unit 10 can be used for storing or preserving diverse products that can be affected by humidity. The storage unit 10 is suited not only for storing nutritional and food items, for instance herbs, spices, teas, caviar, truffles, gourmet cheeses, delicatessen and meat products, but also for preserving luxury items like tobacco or body care products such as bathing salts or cosmetics.

FIG. 6 through FIG. 8 show a second embodiment of the present teaching. The foregoing description is also analogously applicable for the second embodiment.

In the second embodiment, seen in FIG. 6, FIG. 6a, FIG. 6b, FIG. 7, and FIG. 8, the inventive storage unit 10 comprises an outer container 1 and an inner container 2, which both have a cylindrical shape in cross-section. As described for the previously illustrated first embodiment, the inner container 2 comprises an inner space 7 for receiving a product that can be affected by humidity. Here the product can be inserted into the inner container 2 by way of a filling opening 201 defined by a sealing edge 27 (see FIG. 7).

The storage unit 10 further includes a covering frame 4 as well as an inner sealing cover 5 and an outer sealing cover 6 (see FIG. 6a), which both have a circular cross-section, and in some cases a seal 61 and a covering element 62. The portions of the covering frame 4 mounted on the outer container 1 or the inner container 2 each comprise a circular cross-section (see FIG. 6). As a result of this interaction of the covering frame 4 with the outer container 1 or the inner container 2, the second embodiment of the present teaching also guarantees that no tea can penetrate into the intermediate space 3.

Connecting means 8 for producing an operative connection between the containers 1, 2, as already described for the first embodiment, are configured in the bottom 12 of the outer container 1 (see FIG. 6b) and in the bottom 21 of the inner container 2. In the second embodiment they are configured as a first indentation 13 or second indentation 22 with cylindrical shape, which correspond with one another (see FIG. 6 and FIG. 8).

Configured between the outer container 1 and the inner container 2 is an intermediate space 3, into which a humidity-regulating means 31, for example in the form of pouches, can be inserted (see FIG. 6).

The inner container 2, as in the first embodiment, can be configured as a frame construction, in which recesses 23 can be perforated, on which perforated layer elements 24 are arranged in each case. The layer elements 24 can be produced, for example, from a steel alloy and comprise a great number of air-exchange openings 28, which serve for atmospheric exchange between the inner space 7 and the intermediate space 3.

Alternatively, with all embodiments of the present teaching, the wall surface 25 of the inner container 2 can be configured from a perforated wall element 29, which comprises a number of air-exchange openings 28. A through-going perforated wall element of this kind can be constructed, for example, of a steel alloy.

Such a perforated wall element 29 is produced, for example, in a rolled-up state as shown in FIG. 9. The perforated wall element 29 is rolled together during its use as wall surface 25 of the inner container 2 of the second embodiment of the storage unit 10, so that it surrounds a cylindrical-shaped inner space 7. The bottom 21 of the inner container 2 in this case is connected with the perforated wall element 29 and, as previously described, can comprise a connecting means 8 to produce an operative connection with the outer container 1. The perforated wall element 29 comprises here a closing edge 27 on its end situated opposite the bottom 21, which defines the filling opening 201.

This configuration of the inner container 2 is particularly advantageous because a particularly efficient atmospheric exchange is possible between the inner space 7 of the inner container 2 and the intermediate space 3, so that a uniform inner atmosphere with a particular degree of humidity can be selected especially easily.

What is claimed is:

1. A storage unit for storing products that can be affected by humidity, comprising:
   an outer container having a closed outer wall, an upper side on which the outer container is open and has an upper edge, and a lower side on which a closed bottom is arranged,
   an inner container having an inner space for receiving the product that can be affected by humidity, a wall surface provided with a number of air-exchange openings, a filling opening, a sealing edge defining the filling opening, and a closed bottom,
   the inner container being reversibly placed in the outer container,
   the filling opening of the inner container being upwardly oriented towards the upper side of the outer container, and an intermediate space for the insertion of a humidity-regulator being formed between the outer container and the inner container,
   a reversibly removable covering frame that can be placed on the outer container and the inner container and extends completely along the upper edge and the sealing edge,
   the covering frame being designed to cover an opening of the intermediate space, between the outer container and the inner container, and
   a frame opening for accessing the inner space being provided in the covering frame,
   a reversibly removable inner sealing cover for closing the frame opening, wherein the inner sealing cover can be placed on the covering frame, and
   a detachable outer sealing cover for closing the outer container or the upper side of the outer container in an airtight manner, wherein the outer sealing cover is separate from the inner sealing cover,
   wherein the outer sealing cover comprises a sealing surface that seals the upper side of the outer container and a completely surrounding bending surface,
   the outer sealing cover being mountable on the outer container in such a way that an upper edge area of the outer wall of the outer container is surrounded by the bending surface, and
   the sealing surface and the bending surface being configured as level,
   wherein the outer sealing cover on a side of the bending surface facing the inner space comprises a first seal that can be placed in surrounding manner on the covering frame and the outer container, wherein a second seal is arranged on a side of the sealing surface facing the inner space, and wherein a covering element that at least partially covers the second seal is positioned on a side of the second seal facing the inner space.

2. The storage unit according to claim 1, wherein the covering frame comprises a first tier, which engages in the inner container, so that a first completely surrounding contact surface is configured, which can be mounted on the sealing edge of the inner container and on which the inner sealing cover can be placed.

3. The storage unit according to claim 1, wherein the covering frame comprises a second tier engaging in the outer container so that a second surrounding contact surface is formed, which can be placed on the upper edge of the outer container.

4. The storage unit according to claim 2, wherein the inner sealing cover comprises an indentation adjusted to the first contact surface, forming an outward-facing, completely surrounding protrusion.

5. The storage unit according to claim 1, wherein the covering element comprises an indentation, and the second seal comprises an insulating recess that corresponds with the indentation, a base surface of the insulating recess corresponding to a base surface of the indentation, so that the covering element in a region of the insulating recess can be arranged contiguously with the outer sealing cover.

6. The storage unit according to claim 1, wherein a completely surrounding flanged edge is provided on the covering element, so that said flanged edge, in mounting the covering element onto the second seal situated on the sealing surface, can expand to brace the covering element against the first seal and the bending surface of the outer sealing cover.

7. The storage unit according to claim 1, wherein the outer container and the outer sealing cover and the second seal and the covering element and a portion of the covering frame mounted on the outer container comprise a rectilinear or square or circular or elliptical cross-section.

8. The storage unit according to claim 1, wherein the inner container and/or the inner sealing cover and/or a portion of the covering frame mounted on the inner container comprise a rectilinear or square or circular or elliptical cross-section.

9. The storage unit according to claim 1, wherein the outer container and/or the inner container are configured as rectilinear or cylindrical.

10. The storage unit according to claim 1, wherein the air-exchange openings are configured for atmospheric exchange between the inner space and the intermediate space, so that a uniform internal atmosphere with a particular degree of humidity can be selected in the inner space and in the intermediate space.

11. The storage unit according to claim 1, wherein the inner container comprises at least one recess with a perforated layer element which covers the recess and in which the air-exchange openings are arranged.

12. The storage unit according to claim 11, wherein the inner container is formed by a frame construction, the inner container comprising recesses on each of its side surfaces, on which perforated layer elements are placed.

13. The storage unit according to claim 11, wherein the perforated layering element is constructed of a steel alloy.

14. The storage unit according to claim 1, wherein the outer container and/or the outer sealing cover and/or the wall surface of the inner container and/or the inner sealing cover are constructed of a type of tin plate.

15. The storage unit according to claim 1, wherein a connector is provided in the bottom of the outer container and/or in the bottom of the inner container to produce a reversibly releasable operative connection between the outer container and the inner container, said connector being arranged in a centered position.

16. The storage unit according to claim 15, wherein a first recess is configured in the bottom of the outer container and a second recess, corresponding with the first recess, is configured in the bottom of the inner container, so that the operative connection between the outer container and the inner container can be established.

17. The storage unit according to claim 16, wherein the first recess and the second recess are of spherical, ellipsoidal or rectilinear configuration, in particular a first undercutting being provided in the first recess and a second undercutting, corresponding therewith, being provided in the second recess, so that the inner container can be locked inside the outer container by being placed in the outer container.

18. The storage unit according to claim 16, wherein recess wall surfaces of the first recess and of the second recess are aligned parallel to outer wall surfaces of the outer container.

19. The storage unit according to claim 1, wherein a hand grip is provided on a side of the inner sealing cover that is turned away from the inner space.

20. The storage unit according to claim 1, wherein
the outer container and the inner container are configured cylindrically,
the outer sealing cover and a portion of the covering frame placed on the outer container have a circular cross-section, and
the inner sealing cover and a portion of the covering frame placed on the inner container comprise a circular cross-section.

21. The storage unit according to claim 1, wherein the wall surface of the inner container is constituted by a perforated wall element, the perforated wall element comprising the number of air-exchange openings.

* * * * *